US010585201B2

(12) United States Patent
Mcardle et al.

(10) Patent No.: US 10,585,201 B2
(45) Date of Patent: Mar. 10, 2020

(54) DATA-DRIVEN, INTERPRETER GUIDED VISUAL ENHANCEMENT OF GEOLOGIC FEATURES IN 3D SEISMIC SURVEY DATA

(71) Applicant: Foster Findlay Associates Limited, Tyne and Wear (GB)

(72) Inventors: Nicolas Mcardle, Aberdeenshire (GB); James Lowell, Durham (GB); Gavin Warrender, Tyne and Wear (GB); Steven Purves, Santa Cruz de Tenerife (ES); Adam Eckersley, Tyne and Wear (GB); Barbara Froner, Durham (GB)

(73) Assignee: Foster Findlay Associates Limited, Tyne and Wear (GB)

( * ) Notice: Subject to any disclaimer, the term of this patent is extended or adjusted under 35 U.S.C. 154(b) by 58 days.

(21) Appl. No.: 14/900,354

(22) PCT Filed: Sep. 16, 2014

(86) PCT No.: PCT/GB2014/052804
§ 371 (c)(1),
(2) Date: Dec. 21, 2015

(87) PCT Pub. No.: WO2015/040375
PCT Pub. Date: Mar. 26, 2015

(65) Prior Publication Data
US 2016/0195625 A1    Jul. 7, 2016

(30) Foreign Application Priority Data

Sep. 20, 2013  (GB) .................................. 1316758.0

(51) Int. Cl.
*G01V 1/34*     (2006.01)
*G01V 1/30*     (2006.01)
*G01V 1/28*     (2006.01)

(52) U.S. Cl.
CPC ................ *G01V 1/345* (2013.01); *G01V 1/28* (2013.01); *G01V 1/30* (2013.01); *G01V 2210/642* (2013.01)

(58) Field of Classification Search
CPC .... G01V 1/345; G01V 2210/642; G01V 1/30; G01V 1/28
(Continued)

(56) References Cited

U.S. PATENT DOCUMENTS 4,843,599 A *   6/1989  Bucker .................... G01D 7/00
                                                         345/591
6,278,949 B1    8/2001  Alam
(Continued)

FOREIGN PATENT DOCUMENTS

WO     WO2004/044615       5/2004

OTHER PUBLICATIONS

International Search Report and Written Opinion from International Application No. PCT/GB2014/052804, dated Mar. 4, 2015 (11 pages).
(Continued)

*Primary Examiner* — Stephen M Bradley
*Assistant Examiner* — Patricia D Reddington
(74) *Attorney, Agent, or Firm* — Workman Nydegger

(57) ABSTRACT

A method for enhancing visual representation of a geologic feature in 3D seismic survey data, comprising the steps of: (a) generating a plurality of first attribute volumes, each comprising at least one characterising attribute, derivable from said 3D seismic data and different from the characterising attributes of any one of the other said plurality of first attribute volumes; (b) generating a plurality of filtered attribute volumes for each one of said plurality of first attribute volumes, utilizing a plurality of distinct filter settings at each one of said at least one characterising attribute;
(Continued)

(c) generating a composite attribute volume by selectively combining one or more of said plurality of filtered attribute volumes so as to maximise visual detectability of said geologic feature.

14 Claims, 10 Drawing Sheets

(58) Field of Classification Search
USPC .......................................................... 702/16
See application file for complete search history.

(56) References Cited

U.S. PATENT DOCUMENTS

| | | | |
|---|---|---|---|
| 7,463,552 B1 | 12/2008 | Padgett | |
| 2006/0122780 A1* | 6/2006 | Cohen | G01V 1/288 702/14 |
| 2011/0295510 A1* | 12/2011 | Gulati | G01V 1/28 702/16 |
| 2012/0257796 A1* | 10/2012 | Henderson | G01V 1/32 382/109 |
| 2017/0039684 A1* | 2/2017 | Bocharov | G06T 5/003 |

OTHER PUBLICATIONS

International Preliminary Report on Patentability from International Application No. PCT/GB2014/052804, dated Oct. 21, 2015 (12 pages).
Colin J Ferguson et al: "Seismic analysis workflow for reservoir characterization in the vicinity of salt", First Break, Oct. 1, 2010 (7 pages).
Jesus Nunex et al: "Adaptive Geobodies: Data driven, interpreter controlled geobody delineation of Channel and Carbonate features/ <3>N", Twelth Internation Congress of the Brazilian Geophysical Society, Aug. 15, 2011.
Mcardle et al: Data driven-interpreter guided geobody interpretation:, 23rd International Geophysical Conference and Exhibition, Aug. 11, 2013.
Jonathan Henderson: "Geological Expression: data driven-interpreter guided approach to seismic interpretation", First Break, Mar. 1, 2012 (6 pages).
International Search Report for application No. GB1316758.0 dated Feb. 3, 2014.

* cited by examiner (a)

(b)

(c)

(a)

(b)

DATA-DRIVEN, INTERPRETER GUIDED VISUAL ENHANCEMENT OF GEOLOGIC FEATURES IN 3D SEISMIC SURVEY DATA

The present invention relates generally to the field of oil and gas exploration, and in particular to the field of computer aided exploration for hydrocarbons using geophysical data, such as for example seismic data, of the earth. Furthermore, the present invention relates to a computerized method and computer system for adaptively determining geologic features, and in particular, to a method for adaptively enhancing visual representation of the geologic feature.

INTRODUCTION

In the oil and gas industry, geological data surveys such as, for example, seismic prospecting and other similar techniques are commonly used to aid in the search for and evaluation of subterranean hydrocarbon deposits. As an example, prospecting operations include three basic stages (i) data acquisition, (ii) data processing and (iii) data interpretation. The success of the prospecting operation generally depends on satisfactory completion of (i), (ii) and (iii). For example, a seismic source is used to generate an acoustic signal that propagates into the earth and that is at least partially reflected by subsurface seismic reflectors. The reflected signals are then detected and recorded by an array of seismic receivers located at or near the surface of the earth, in an overlying body of water, or at known depths of boreholes.

FIG. 1 shows a typical setup for offshore seismic surveys, where a large seismic survey vessel 10 is used to tow acoustic receivers 12, also known as streamers, suspended below the surface, which carry hydrophones (not shown). During data acquisition, sound waves 14 are transmitted from the vessel 10 using compressed air guns 16 which travel down through the seabed and reflect back from the different layers of rock 18, 20, 22. The reflected sound waves 14 are then received by the hydrophones (not shown) located along the seismic streamers which when processed can be used to provide a visual representation (2D, 3D) of the substrata.

Typical seismic traces of the reflections (amplitudes) are shown in FIG. 2. The data shown in FIG. 2 has been migrated, i.e. the amplitudes of the traces are moved to their true subsurface position (depth) to eliminate any offset between the source and receiver.

FIGS. 3 and 4 show an example of a 3D seismic data volume 24 and a respective 2D slice 26 of the 3D seismic volume 24 based on the migrated reflectivity data. The representation clearly shows different horizons 28 (i.e. the surface separating two strata having different acoustic properties) and further allows the identification of so called faults 30. In the field of geology, faults 30 are surface planes within the earth's crust at which sedimentary layers (strata, horizons) and other geological features are disrupted. In particular, faults 30 can form effective barriers to subsurface hydrocarbon flow, causing oil and gas to accumulate at faults 30.

Accordingly, the precise detection, characterization and visualization of any geologic feature, such as horizons 28 and faults 30, to name only a few, can be a very valuable tool in the search for oil and gas reserves, wherein the accuracy and completeness with which such geologic feature can be detected, characterized and visualized may have a significant impact on identifying and exploiting potential hydrocarbon reserves.

In a conventional workflow (i.e. a series of concatenated steps undertaken by an operator) for interpretation of geologic features, such as faults, the workstation operator (interpreter) (i) views the seismic data volume on a display, (ii) manually determines by viewing the seismic data where a plurality of horizons may be located in the seismic data, and (iii) manually determines by viewing the coherence of the horizons where fault cuts may be located. During this process, the workstation operator (interpreter) has to ensure that the determined faults conform to geological feasibility.

Therefore, in order to make subtle features in the reflectivity data more discernible and therefore improve the ease of manual and/or automated detection of any geologic features, it is common practice to mathematically process the seismic reflectivity data (i.e. seismic reflection traces) in accordance with known techniques so as to extract specific data characteristics. These data characteristics are also known as "attributes" or "seismic attributes" and a data volume disclosing one or more of those attributes is known as an "attribute volume". Seismic attributes are understood to be any measurement derived from the seismic data and typically provide information relating to the amplitude, shape and/or position of the seismic waveform in order to reveal features, relationships and patterns within the seismic data that may not be detected otherwise. More recently, attributes are calculated using more than one input seismic trace, therefore providing quantitative information about lateral variations in the seismic data. The so-called multi-trace attributes (i.e. when comparing multiple traces) may include coherence, dip/azimuth, structural orientation, semblance or volumetric curvature. However, any one attribute that highlights geological features (e.g. faults, horizons) typically does so in an incomplete way, only capturing certain characteristics, for example, of the fault expression within the seismic data, and even combining multiple attributes may not be sufficient to accurately characterise and distinctively visualize the geologic features in a 2D or 3D seismic survey data volume.

FIG. 5 shows an example of a typical attribute volume 32 where faults are highlighted using a structurally orientated $1^{st}$ derivative filter.

However, the ability to compute lots of different attributes can easily lead to a classic "more is less" situation, i.e. going from data overload to information overload with little gain in understanding but with a considerable risk of increased data management problems. One effective way to visualise the information more comprehensibly is to colour blend the individual components in a predefined colour space, such as, for example, RGB (Red-Blue-Green) space or CMY (Cyan-Magenta-Yellow) space.

Colour blending provides an intuitive means of examining the relationship between different aspects of the geology expressed in the data. In particular, colour blending involves creating an image where the colour at each point in the image is defined by the values of three, spatially registered input images (e.g. three attribute volumes) using RGB, CMY or Hue-Saturation-Value (HSV) colour models. The resulting image can be extremely informative.

It is evident that any impairment of the visual representation of the information contained in the seismic data leads to inaccurate or even false interpretations of the seismic survey data, potentially causing increased time and cost spent on "deciphering" the data set. Also, different geologic features and/or different seismic survey data sets may require an intuitive or adaptive application of different data processing techniques, in order to maximise the content and quality of information provided in the visual representation.

However, currently available seismic data visualisation tools still demand a relatively labour intensive workflow in order to detect and visualise potential geologic features at usually suboptimal image quality.

Accordingly, it is an object of the present invention to provide a method and system that is adapted to provide an improved workflow for a data-driven and interpreter guided visual enhancement of visualisation and detection of geologic features.

SUMMARY OF THE INVENTION

Preferred embodiments of the invention seek to overcome one or more of the above disadvantages of the prior art.

According to a first aspect of the present invention, there is provided a method for enhancing visual representation of a geologic feature in 3D seismic survey data, comprising the steps of:
  generating a plurality of first attribute volumes, each comprising at least one characterising attribute, derivable from said 3D seismic data and different from the characterising attributes of any one of the other said plurality of first attribute volumes;
  generating a plurality of filtered attribute volumes for each one of said plurality of first attribute volumes, utilizing a plurality of distinct filter settings at each one of said at least one characterising attribute;
  generating a composite attribute volume by selectively combining one or more of said plurality of filtered attribute volumes so as to maximise visual detectability of said geologic feature.

Advantageously, each of said at least one characterising attribute of said plurality of first attribute volumes may be determined in accordance with the seismic properties of said geologic feature.

Preferably, the method may further comprises the step of:
  selectively adjusting at least one filter parameter and/or at least one image parameter of any one of said plurality of filtered attribute volumes and/or said composite attribute volume, so as to maximise enhancement of the visual representation of said geologic feature.

Advantageously, the method of the present invention may be further adapted to be executed fully automatically using predefined criteria for specific geologic features that will maximise the quality of visual enhancement without an interpreters guidance and/or interference, as well as, with the guidance of an interpreter (e.g. by manually selecting a combination of pre-processed and filtered attribute volumes in order to create a visual presentation of a composite volume).

This provides the advantage that each data set of interest from a 3D seismic survey data can be processed individually to maximally enhance the visual representation of one or more specific geologic features of interest, e.g. faults. In particular, by applying one or more attribute(s) most suitable to depict a specific geologic feature (e.g. fault) and "fine-tuning" applied filter settings of a plurality of attribute volume(s) before generating a composite of the most suitable filtered and "fine-tuned" attribute volumes, a maximum in quality of the visual representation of the geologic feature is achieved. The method also provides the advantage of an improved data-driven interpreter guidance to maximise the information that can be comprehensibly visually presented for interpretation. In addition, an interpreter will be able to selectively fine-tune and combine any one of the pre-processed attribute volumes, therefore considerably minimising the time spent to maximise the quality of the visual representation of one or more geologic features within the 3D seismic survey data.

Advantageously, the filter parameter may be a filter kernel size. Even more advantageously, the at least one filter parameter may be a standard deviation $\sigma$ of a Gaussian smoothing filter.

Preferably, the at least one image parameter may be any one of a contrast, saturation, sharpness, brightness and hue, or any combination thereof.

Advantageously, the method may further comprise the step of:
  generating a colour-blend attribute volume by selectively combining two or more of said plurality of filtered attribute volumes, each one utilizing a distinct predetermined colour.

This provides the advantage to further enhance the quality of visual presentation of the geologic feature(s), as well as, the amount of information that can qualitatively processed for interpretation of the seismic data.

Advantageously, the colour-blend attribute volume may be generated by selectively combining three of said plurality of filtered attribute volumes. Preferably, said colour-blend attribute volume may be generated utilizing colours from a CMY colour blend. Alternatively, said colour-blend attribute volume may be generated utilizing colours from a RGB colour blend.

Advantageously, the method may further comprise the step of:
  detecting at least one geologic feature in any one of said filtered attribute volumes and/or said composite attribute volume and/or said colour-blend attribute volume.

This provides the advantage of improved detectability of the geologic feature of interest, since the enhanced visual presentation allows for a more accurate detectability of a geologic feature of interest.

Preferably, said detected at least one geologic feature may be visually marked within any one of said filtered attribute volumes and/or said composite attribute volume and/or said colour-blend attribute volume.

Advantageously, step (c) and/or (d) may be selectively repeatable so as to maximise the quality and/or quantity of the information provided in said composite attribute volume. Even more advantageously, step (e) may be selectively repeatable so as to maximise the quality and/or quantity of the information provided in said composite attribute volume. Even more advantageously, step (f) may be selectively repeated after each reiterated step (c) and/or (d) and/or step (e).

According to a second aspect of the present invention, there is provided a computer system for data-driven, interpreter guided enhancement of the visual representation of at least one geologic feature in 3D seismic survey data by a method according to the first aspect of the present invention.

According to a third aspect of the present invention, there is provided a computer readable storage medium having embodied thereon a computer program, when executed by a computer processor that is configured to perform the method of the first aspect of the present invention.

BRIEF DESCRIPTION OF THE DRAWINGS

Preferred embodiments of the present invention will now be described, by way of example only and not in any limitative sense, with reference to the accompanying drawings, in which.

DETAILED DESCRIPTION OF THE PREFERRED EMBODIMENT(S)

The exemplary embodiments of this invention will be described in relation to interpretation of 3D seismic data. However, it should be appreciated that, in general, the system and method of this invention will work equally well for any other type of 3D data from any environment.

Figure 12:
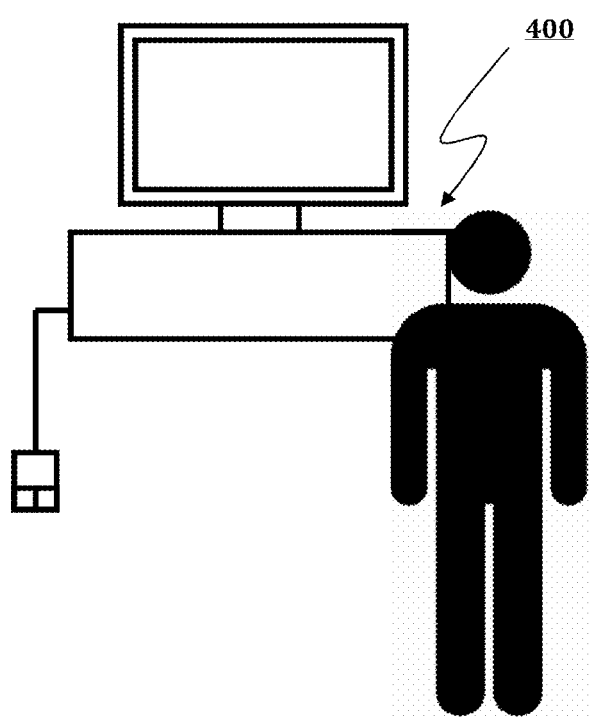
FIG. 12 shows a simplified example of a system and set-up in accordance with the present invention.

For purposes of explanation, it should be appreciated that the terms 'determine', 'calculate' and 'compute', and variations thereof, as used herein are used interchangeably and include any type of methodology, process, mathematical operation or technique, including those performed by a system 400, as depicted in a simplified form in FIG. 12. The terms 'generating' and 'adapting' are also used interchangeably describing any type of computer modelling technique for visual representation of a subterranean environment from geological survey data, such as 3D seismic data.

Figure 1:
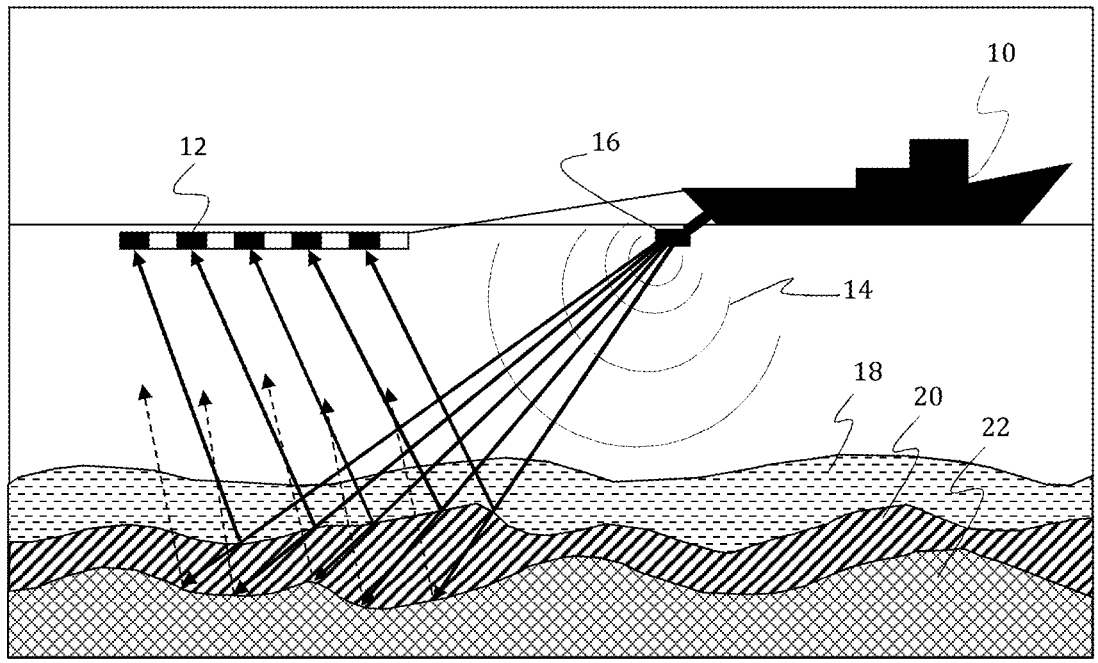
FIG. 1 shows a typical setup for an offshore seismic survey using an array of acoustic receivers (i.e. hydrophones) and sound waves generated by an air gun.
Figure 2:
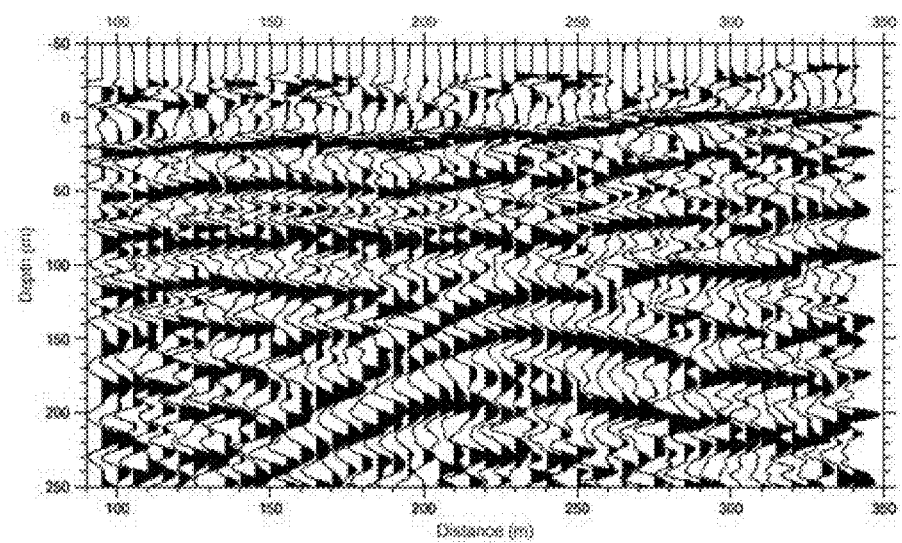
FIG. 2 shows a typical plot of migrated reflection traces recorded by the acoustic receivers after activating the air gun.
Figure 3:
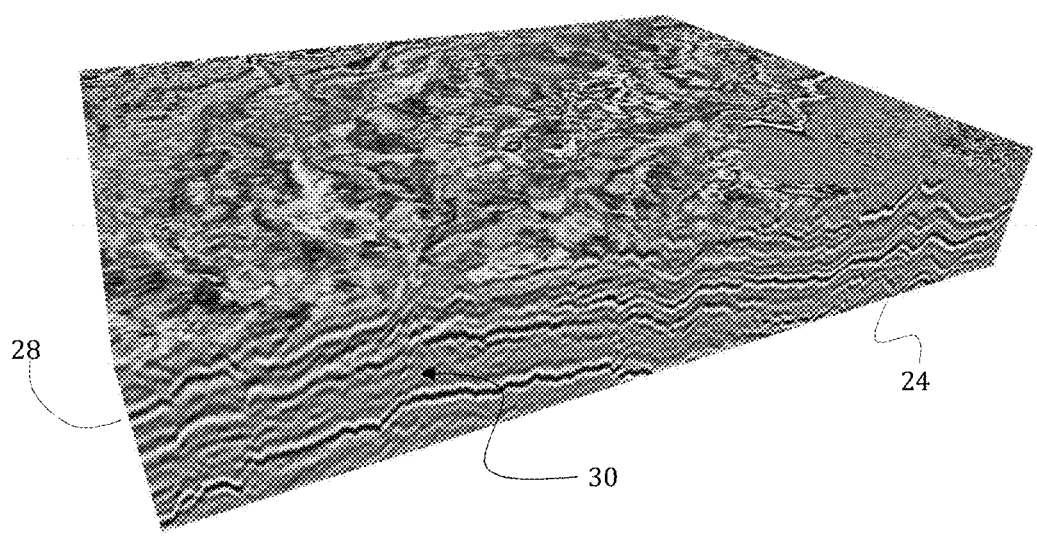
FIG. 3 shows a 3D volume of the migrated reflection data recorded by the acoustic receivers.
Figure 4:
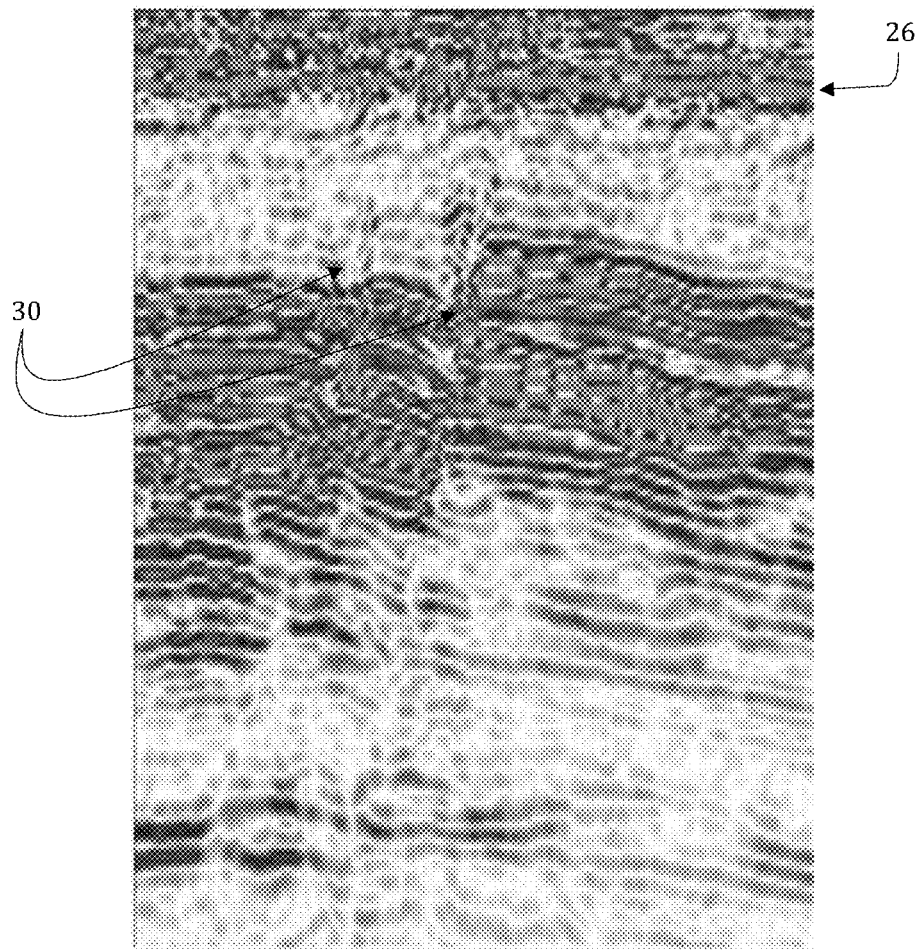
FIG. 4 shows a 2D slice of the 3D volume shown in FIG. 3 clearly showing discontinuities in the horizon layers caused by faults.
Figure 5:
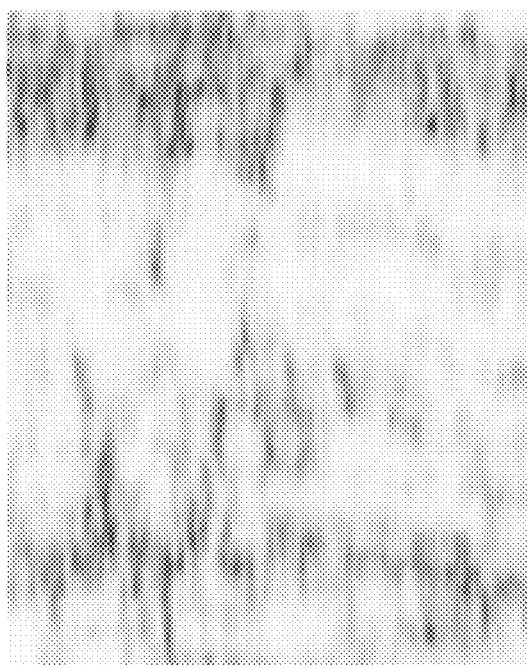
FIG. 5 shows a 2D slice of 3D attribute volumes in which the faults are highlighted using (a) a structurally oriented semblance (SOS) $1^{st}$ derivative filter, (b) a structurally oriented discontinuity (SOD) filter and (c) a tensor filter.
Figure 5:
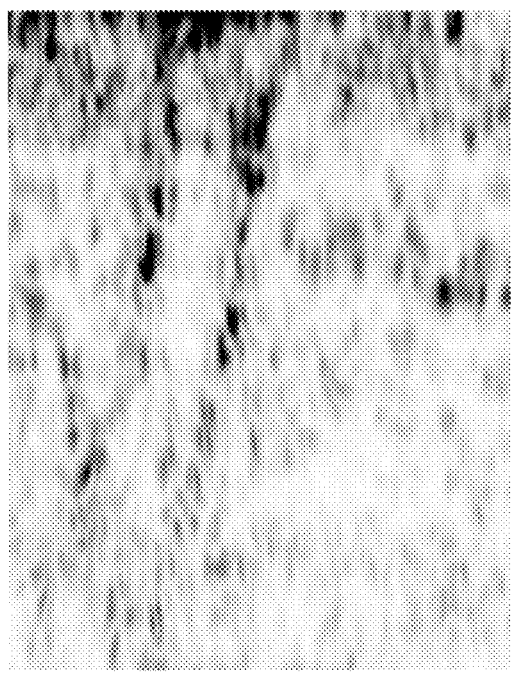
Figure 5:
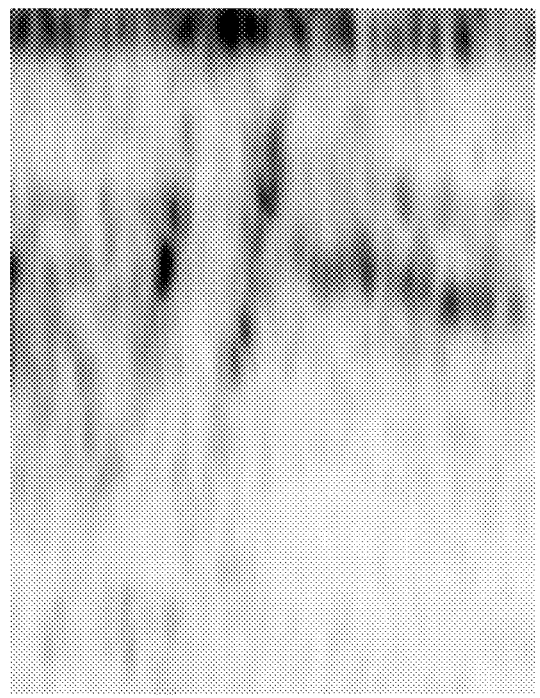
Figure 6:
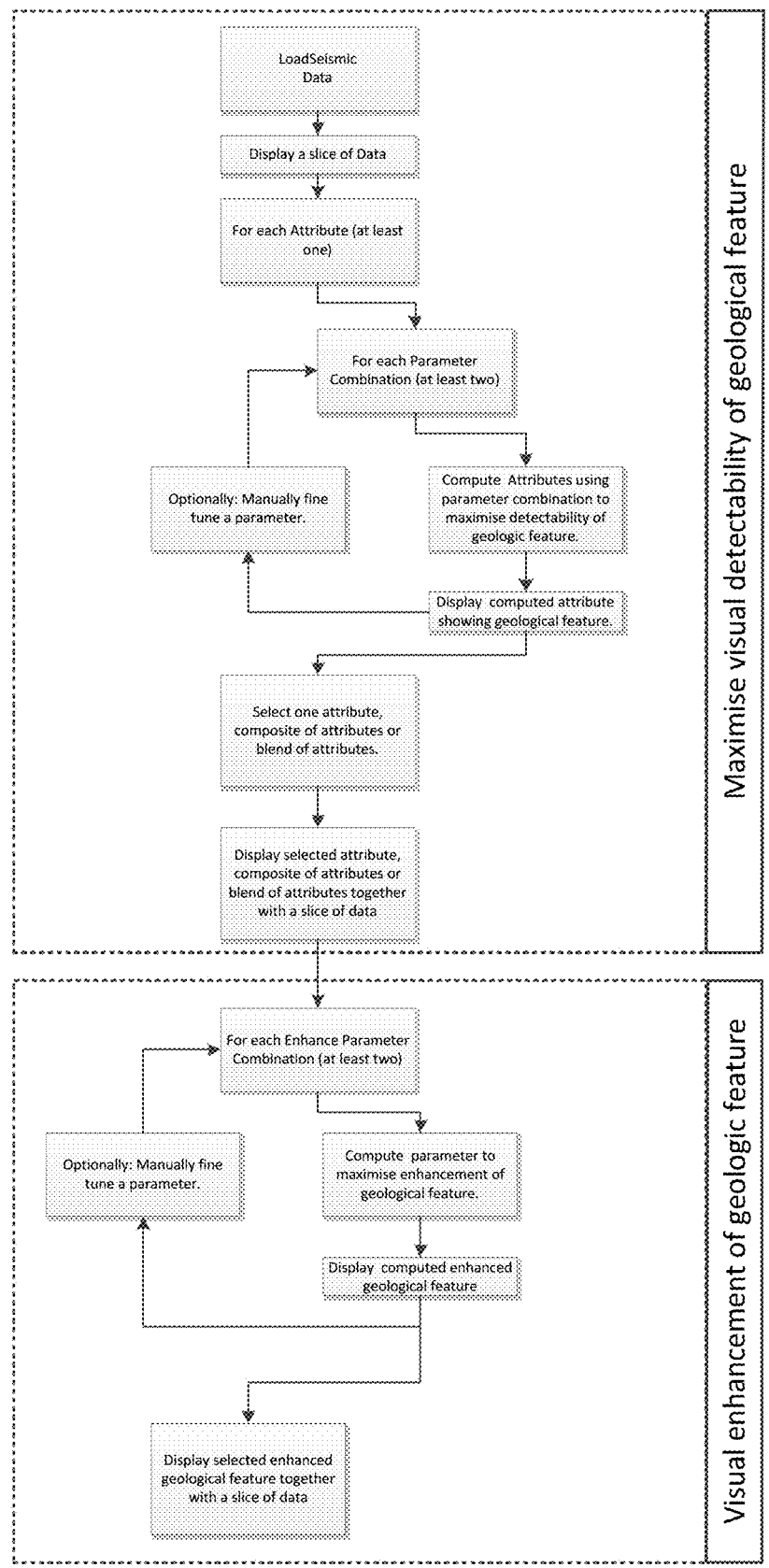
FIG. 6 shows a flow chart of a typical interpreter guided workflow of the method of the present invention.

A typical data-driven and interpreter guided workflow is now described with reference to a simplified flow chart illustrated in FIG. 6 and in view of FIGS. 7 to 11. In this example the method is applied to visually enhance and detect faults, but any other geologic feature may be used.

Figure 7:
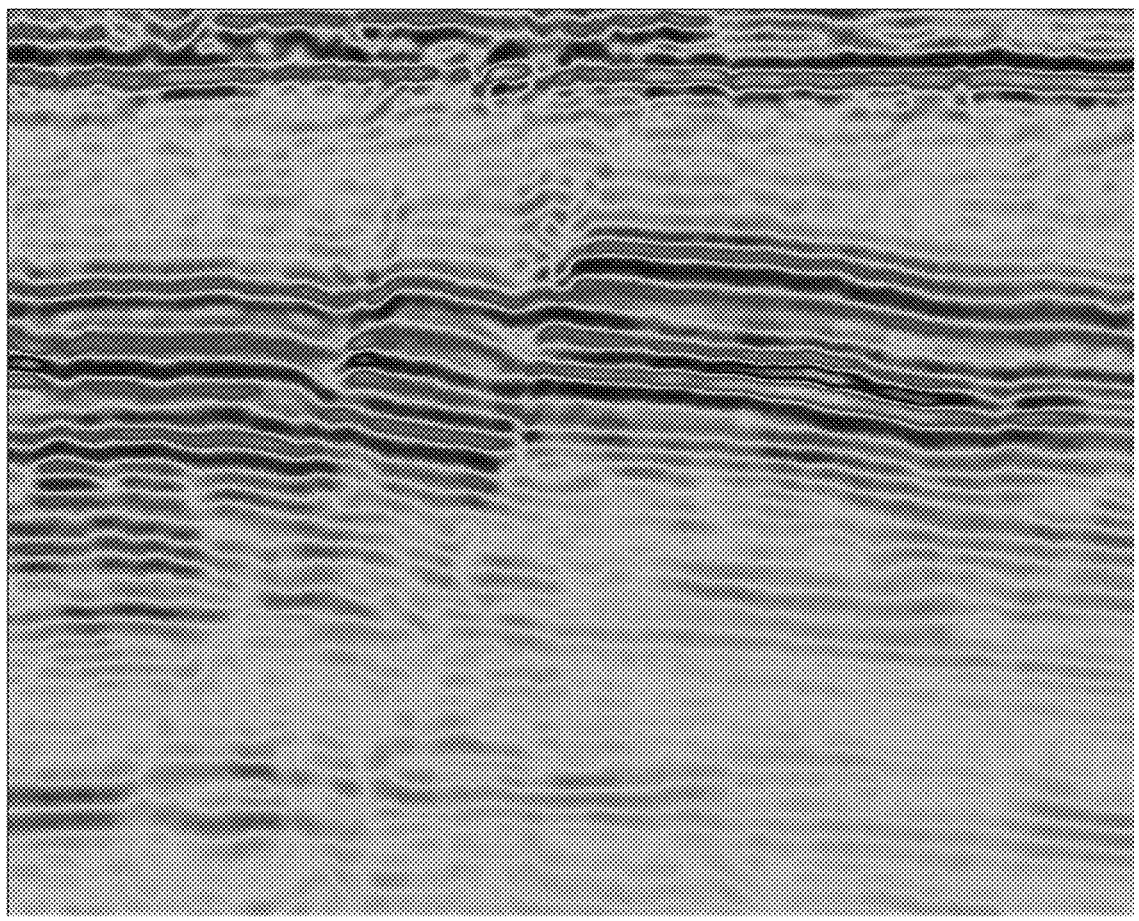
FIG. 7 shows a slice of a conditioned 3D seismic survey data.

In order to enhance the visual representation of potential faults within the conditioned seismic data, the 3D seismic data is loaded into the memory of a computer system, and a representative vertical slice of the 3D data is displayed for visual inspection as shown in FIG. 7. Based on the known properties of geologic structures and/or the geological environment the three most suitable attributes are selected to generate three different attribute volumes (e.g dip/azimuth, and Structurally Oriented Dip Derivative) and representative vertical slices, each of which is processed using three different filter settings, forming a 3×3 matrix of the initial vertical slice visually presented utilizing three different attributes and three different filter settings. The applied filter may be a smoothing filter, such as Gaussian Smoothing, applying different Kernel sizes for each one of the different attribute representations (see FIG. 8 (a)). An interpreter then inspects each of the attribute/filter settings combinations (i.e. A1F1, A2F1, . . . , A3F3) in order to find one or more "candidates" that, when combined, provide a maximum of information to unambiguously depict the geologic features, such as faults.

Figure 8:
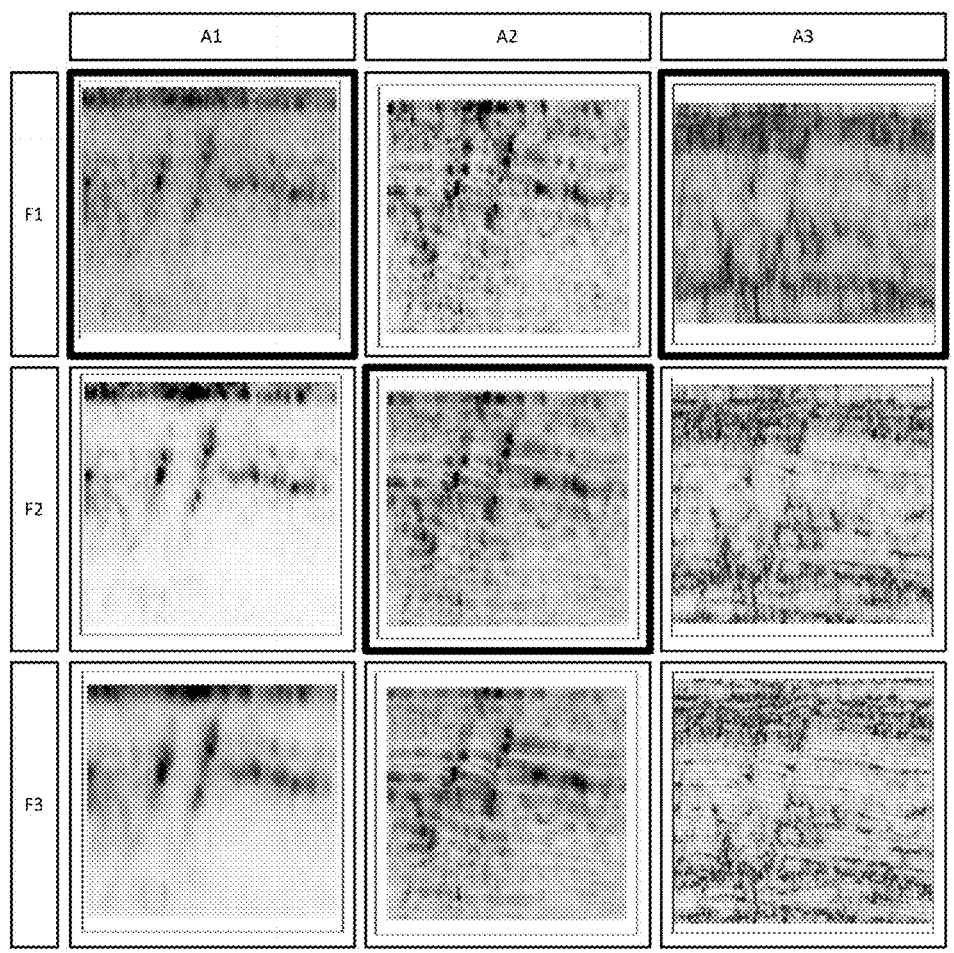
FIG. 8 shows (a) slices of the seismic data of FIG. 7 in a 3×3 matrix at three different attribute volumes and three different filter settings, creating a plurality of visual representations of a particular geologic feature, and (b) the composite of three slices of the 3×3 matrix in (a), i.e. a composite of slices A1F1, A2F2 and A3F1, selected as best representatives to depict the geologic feature (e.g. faults)
Figure 8:
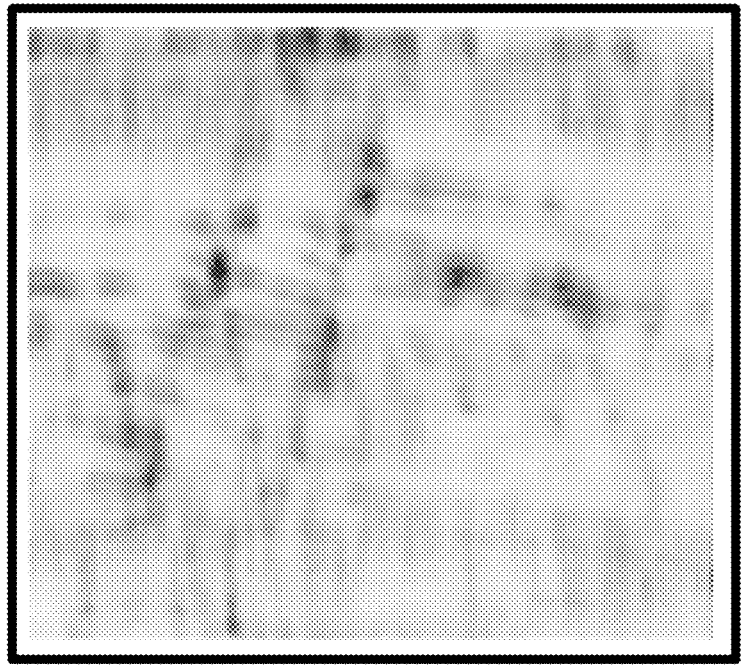

An example of a composite slice is shown in FIG. 8 (b), combining A1F1, A2F2 and A3F1 from the 3×3 matrix in FIG. 8 (a).

The interpreter now "fine-tunes" the filter settings for each of the three different attributes to further enhance the quality of visual representation of the faults within the seismic data. In particular, kernel size and/or footprint size, as well as, contrast, saturation, sharpness, brightness and hue may be adjusted to maximise clarity and completeness of the faults.

Figure 10:
FIGS. 10 and 11 show a typical interface of a computer installed software program and various steps of the workflow of the method of the present invention, i.e. (i) generation of 3×3 matrix of different attributes and filter settings, (ii) selecting one or more candidate from the 3×3 matrix to generate a composite representation and fine-tune the filter settings for maximum visual enhancement of the geologic feature, (iii) superimposing the composite with the original slice of seismic data, (iv) selecting three candidates from the 3×3 matrix to generate a colour blend (i.e. CMY blend), (v) fine-tune the CMY colour blend to maximise visual enhancement of the geologic feature, (vi) detect and mark geologic features (e.g. faults) in the CMY colour blend and super impose with the slice of seismic data to maximise information content for interpretation.
Figure 11:

The interpreter may repeat the steps of "fine-tuning", selecting one or more "candidates" and generate a composite image of the combined "candidates" until a best visual representation of the faults is found for further interpretation (see also FIGS. 10 and 11, i-vi).

Further visual enhancement may be achieved by applying a colour blend to the three best "candidates" utilizing, for example, a CMY (Cyan-Magenta-Yellow) or RGB (Red-Green-Blue) colour blend (see also FIG. 11, iv-vi). Again, this process may be repeated by the interpreter until a best visual representation of the faults is found. The interpreter can combine any three "candidates" and instantly evaluate the quality of information provided.

Figure 9:
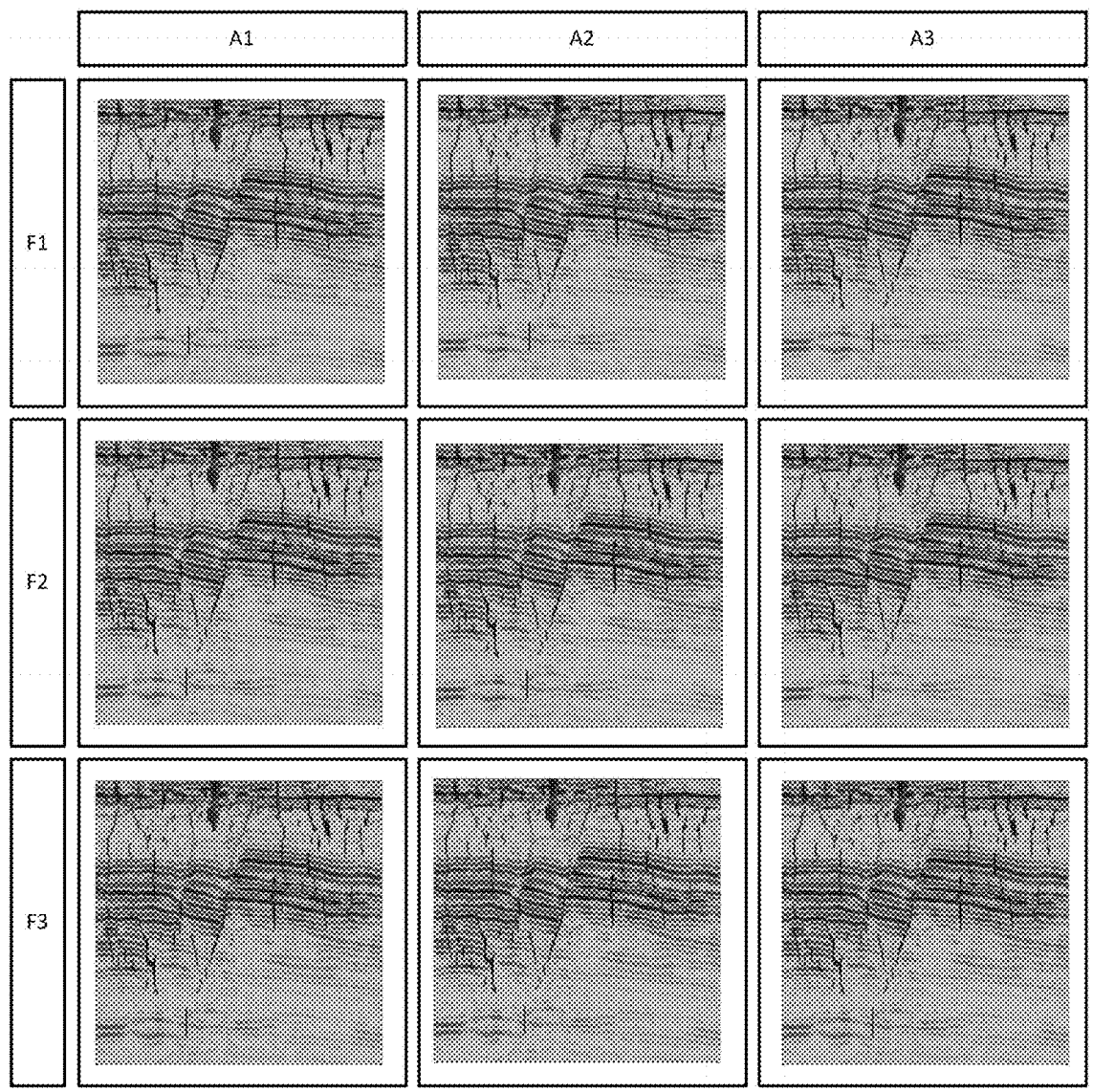
FIG. 9 shows marked detected geologic features (i.e. faults) in each of the attribute/filter combinations in FIG. 8 superimposed with a transparent slice of the conditioned seismic survey data of FIG. 7.

At any stage during this process, an automatic detection of geologic features (i.e. faults) may be executed for any one of the "candidates" or composites. FIG. 9 shows colour-marked faults that are detected in each one of the different attribute/filter settings combinations of the 3×3 matrix, allowing the interpreter to instantly compare the quality and completeness of information provided.

As can be understood from the described example, the interactive data-driven (i.e. volume generation of preselected attributes for specific geological features, and generation of filtered visual representations at predetermined filter settings) and interpreter guided (i.e. fine-tuning, composites of attributes, filters and colour blends) method of enhancement of the visual representation of geological features, such as faults, is considerably faster and user friendly than any of the currently available techniques, providing instant feedback to the user, therefore, maximising quality and quantity of the visual information provided by the seismic data and allowing much more accurate assessments and predictions, saving cost and time.

It is further understood that any or all of the steps performed manually by an interpreter, may be automated by the software installed on the computer system. For example, predetermined image processing parameters (embedded into the software program) may be utilized to automatically "fine-tune" and combine "candidates" for a best possible visual representation of the geologic feature of interest.

FIG. 12 shows a simplified illustration of a typical workstation 400 including a computer and monitor operable by a user.

It will be appreciated by persons skilled in the art that the above embodiment has been described by way of example only and not in any limitative sense, and that various alterations and modifications are possible without departing from the scope of the invention as defined by the appended claims.

The invention claimed is:

1. A method for enhancing a visual representation of a geologic feature in 3D seismic survey data, comprising the steps of:
   (a) receiving 3D seismic survey data of a geologic site, the 3D seismic survey data generated from acoustic signals propagated from a seismic source toward one or more subsurface seismic reflectors at the geologic site and at least partially reflected by the subsurface seismic reflectors, wherein the at least partially reflected acoustic signals were detected by an array of seismic receivers located at or near the surface of the geologic site, in an overlying body of water, or at boreholes at or near the geologic site, and wherein the detected acoustic signals were processed to form the 3D seismic survey data;
   (b) generating a plurality of first attribute volumes, each comprising at least one characterizing attribute, derivable from said 3D seismic survey data and different from the characterizing attributes of any one of the other said plurality of first attribute volumes;
   (c) generating a plurality of filtered attribute volumes for each one of said plurality of first attribute volumes, utilizing a plurality of distinct filter settings at each one of said plurality of first attribute volumes;
   (d) generating a composite attribute volume by selectively combining one or more of said plurality of filtered attribute volumes, wherein the composite attribute volume depicts the geological feature, so as to provide instant feedback to the user and increase any one of a contrast, saturation, sharpness, brightness, or hue of said geologic feature; and
   (e) selectively adjusting at least one filter parameter of any one of said plurality of filtered attribute volumes and/or said composite attribute volume, so as to enhance the visual representation of said geologic feature,
      wherein enhancing the visual representation comprises increasing any one of the contrast, saturation, sharpness, brightness, or hue of said geologic feature, and wherein said filter parameter is a filter kernel size and/or a standard deviation a of a Gaussian smoothing filter.

2. A method according to claim 1, wherein step (e) includes selectively adjusting at least one filter parameter and at least one image parameter of any one of said plurality of filtered attribute volumes and/or said composite attribute volume, so as to enhance the visual representation of said geologic feature.

3. A method according to claim 1, wherein each of said at least one characterizing attribute of said plurality of first attribute volumes is determined in accordance with the seismic properties of said geologic feature.

4. A method according to claim 1, further comprising the step of:
   (f) generating a color-blend attribute volume by selectively combining two or more of said plurality of filtered attribute volumes, each one utilizing a distinct predetermined color.

5. A method according to claim 4, wherein said color-blend attribute volume is generated by selectively combining three of said plurality of filtered attribute volumes.

6. A method according to claim 4, wherein said color-blend attribute volume is generated utilizing colors from a CMY color blend.

7. A method according to claim 4, wherein said color-blend attribute volume is generated utilizing colors from a RGB color blend.

8. A method according to claim 4, further comprising the step of:
   (g) detecting at least one geologic feature in any one of said filtered attribute volumes and/or said composite attribute volume and/or said color-blend attribute volume.

9. A method according to claim 8, wherein said detected at least one geologic feature is visually marked within any one of said filtered attribute volumes and/or said composite attribute volume and/or said color-blend attribute volume.

10. A method according to claim 1, wherein steps (d) and/or (e) are selectively repeatable in order to increase the quality and/or quantity of the information provided in said composite attribute volume.

11. A method according to claim 4, wherein step (f) is selectively repeatable in order to increase the quality and/or quantity of the information provided in said composite attribute volume.

12. A method according to claim 8, wherein step (g) is selectively repeated after each reiterated step (d) and/or step (e) and/or step (f).

13. A computer system for enhancing visual representation of at least one geologic feature in 3D seismic survey data by a method according to claim 1.

14. A computer readable storage medium having embodied thereon a computer program, when executed by a computer processor that is configured to perform the method of claim 1.

* * * * *